May 17, 1960 E. J. MAY ET AL 2,936,672
AUTOMATIC RECYCLING SLIDE PROJECTOR
Filed Oct. 7, 1953 11 Sheets-Sheet 1
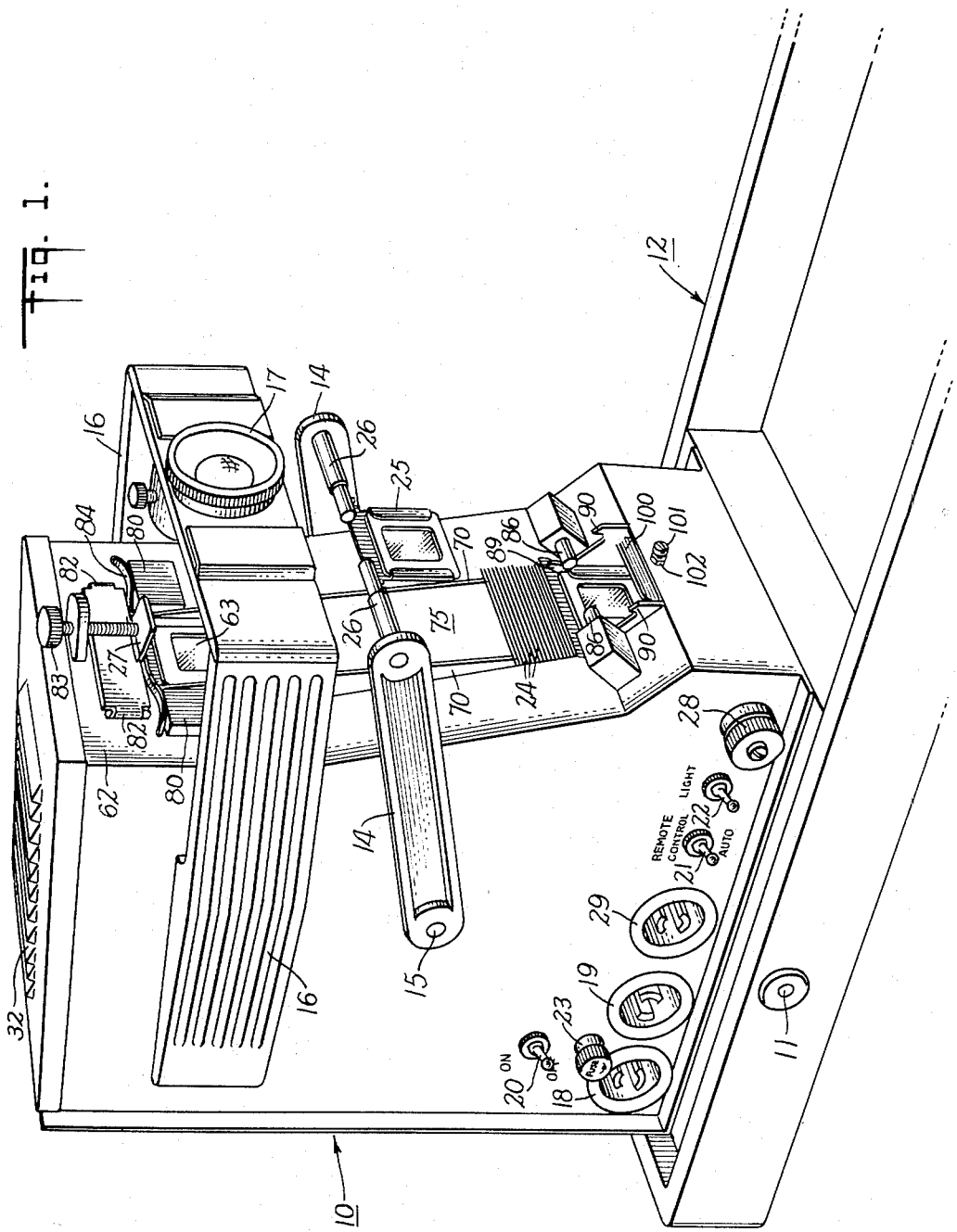
INVENTORS
Edward J. May
Louis R. Morse
BY
Watson Johnson Leavenworth & Blair
ATTORNEYS

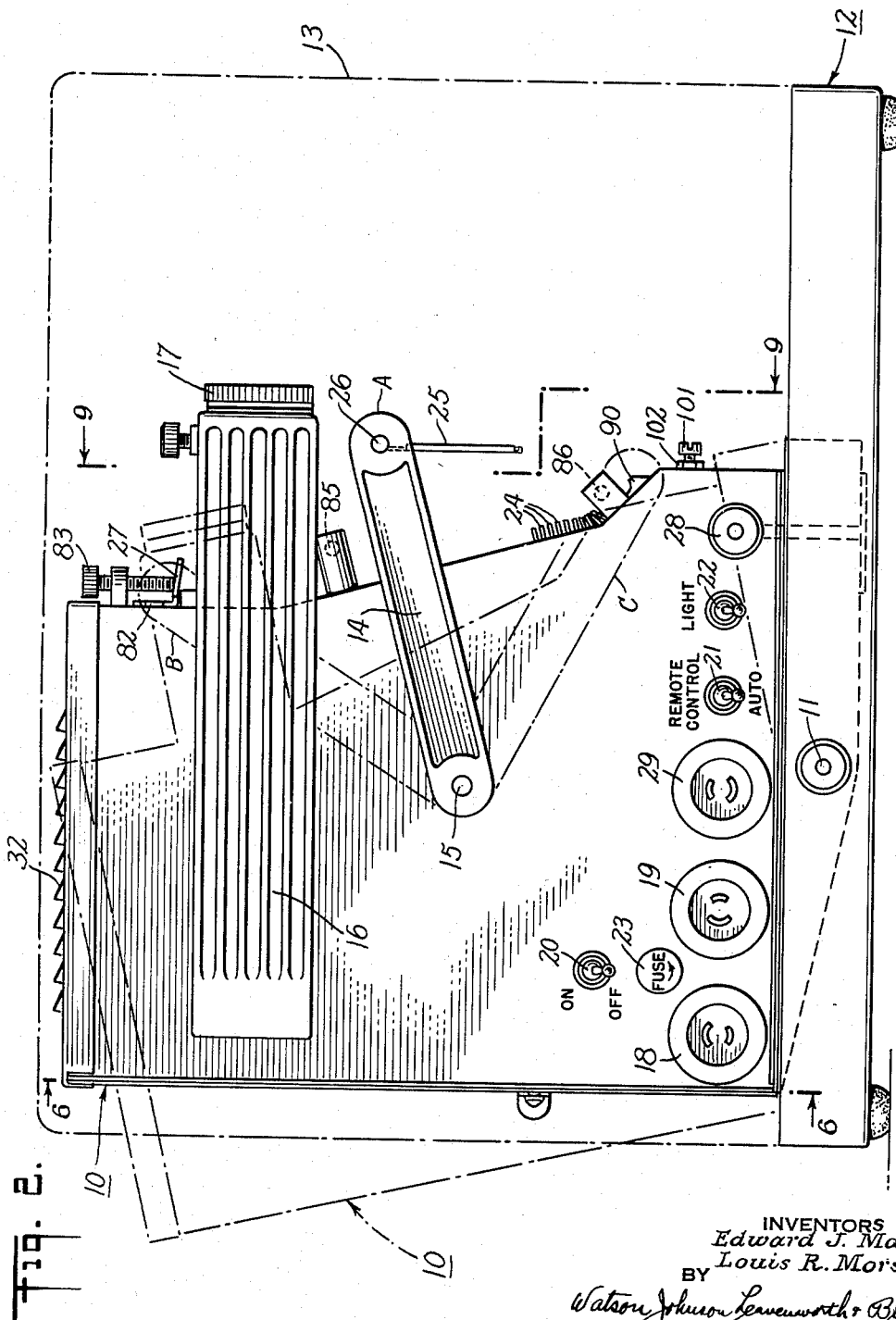

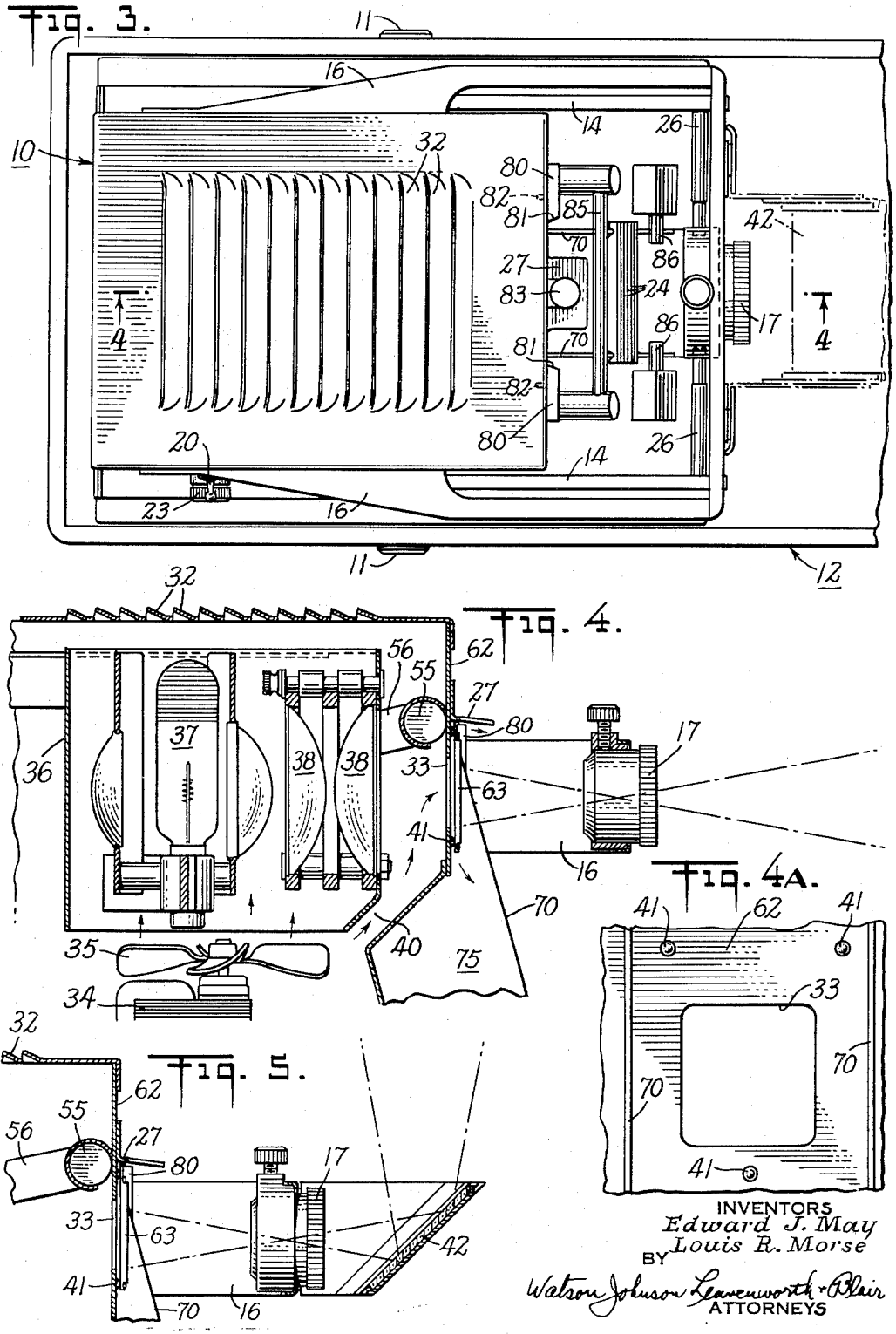

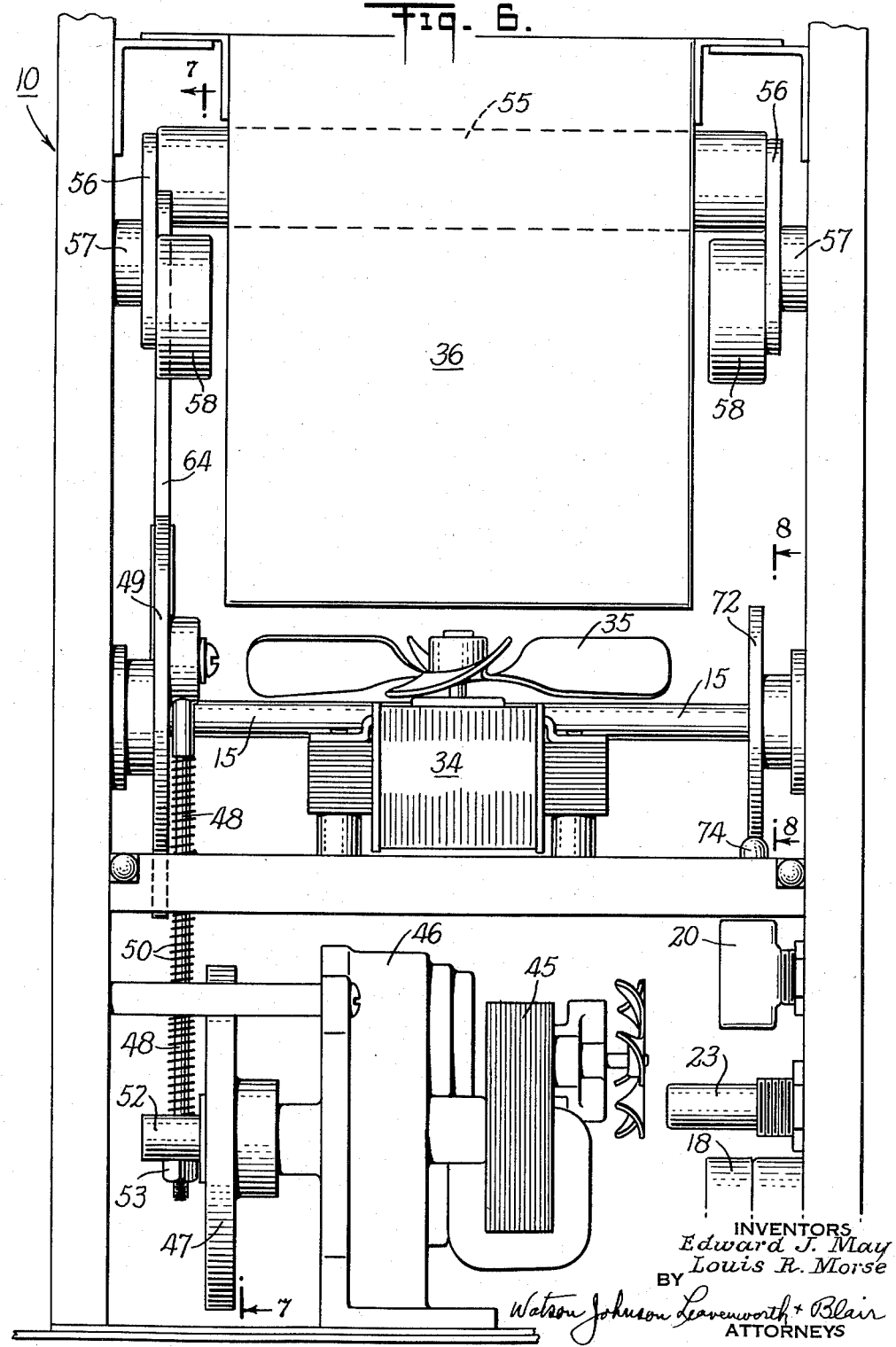

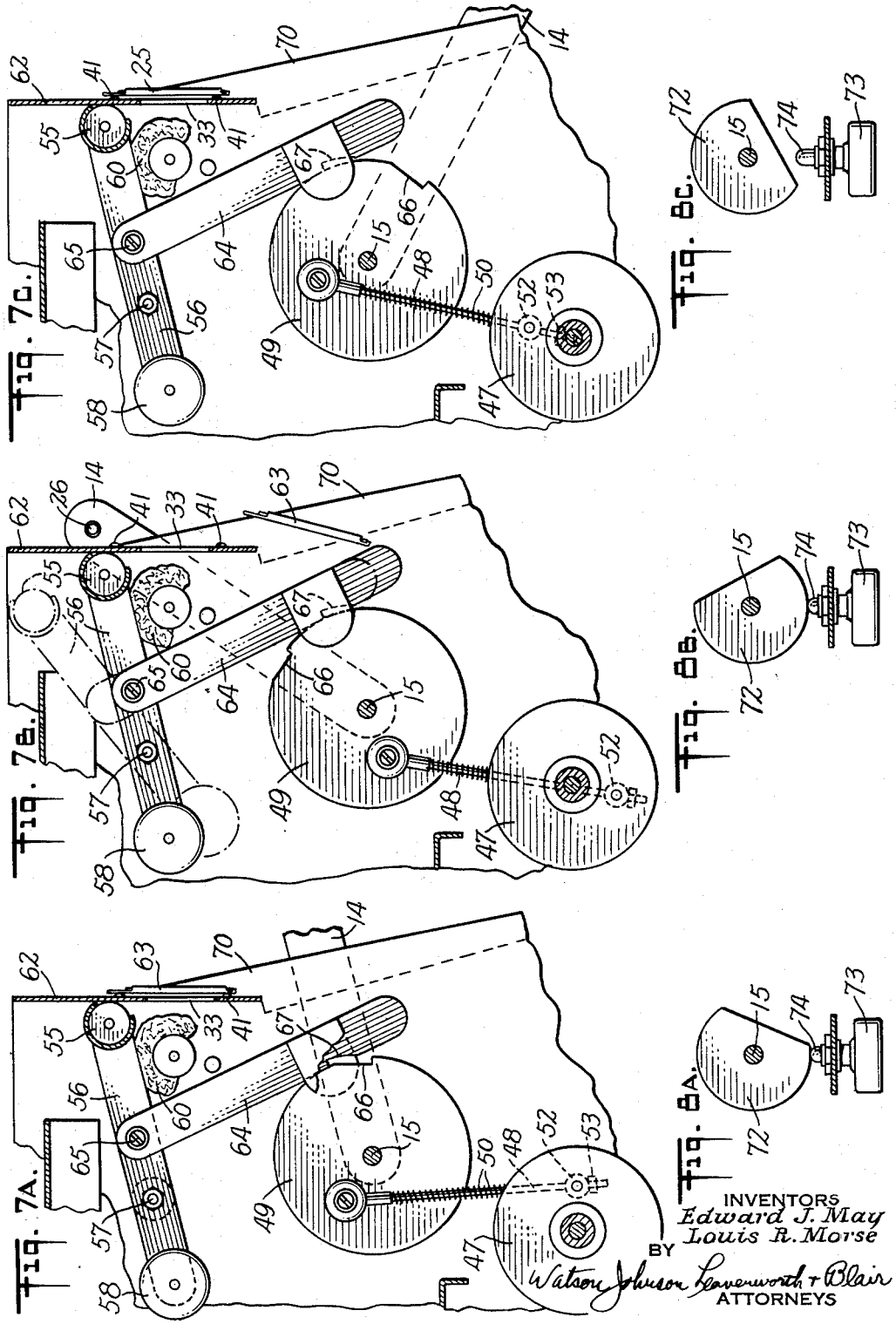

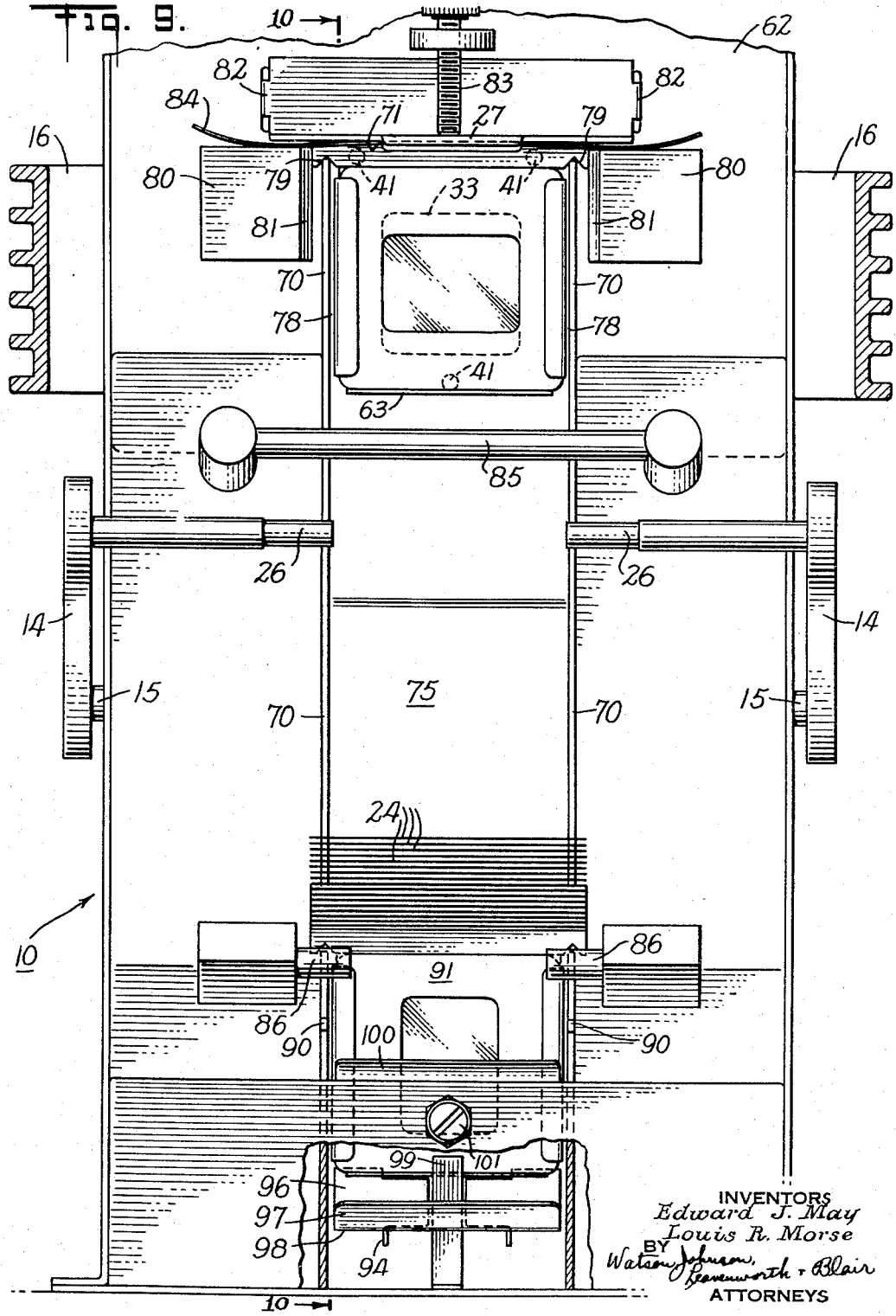

May 17, 1960 E. J. MAY ET AL 2,936,672
AUTOMATIC RECYCLING SLIDE PROJECTOR
Filed Oct. 7, 1953 11 Sheets-Sheet 7

INVENTORS
Edward J. May
Louis R. Morse
BY
Watson Johnson Leavenworth & Blair
ATTORNEYS

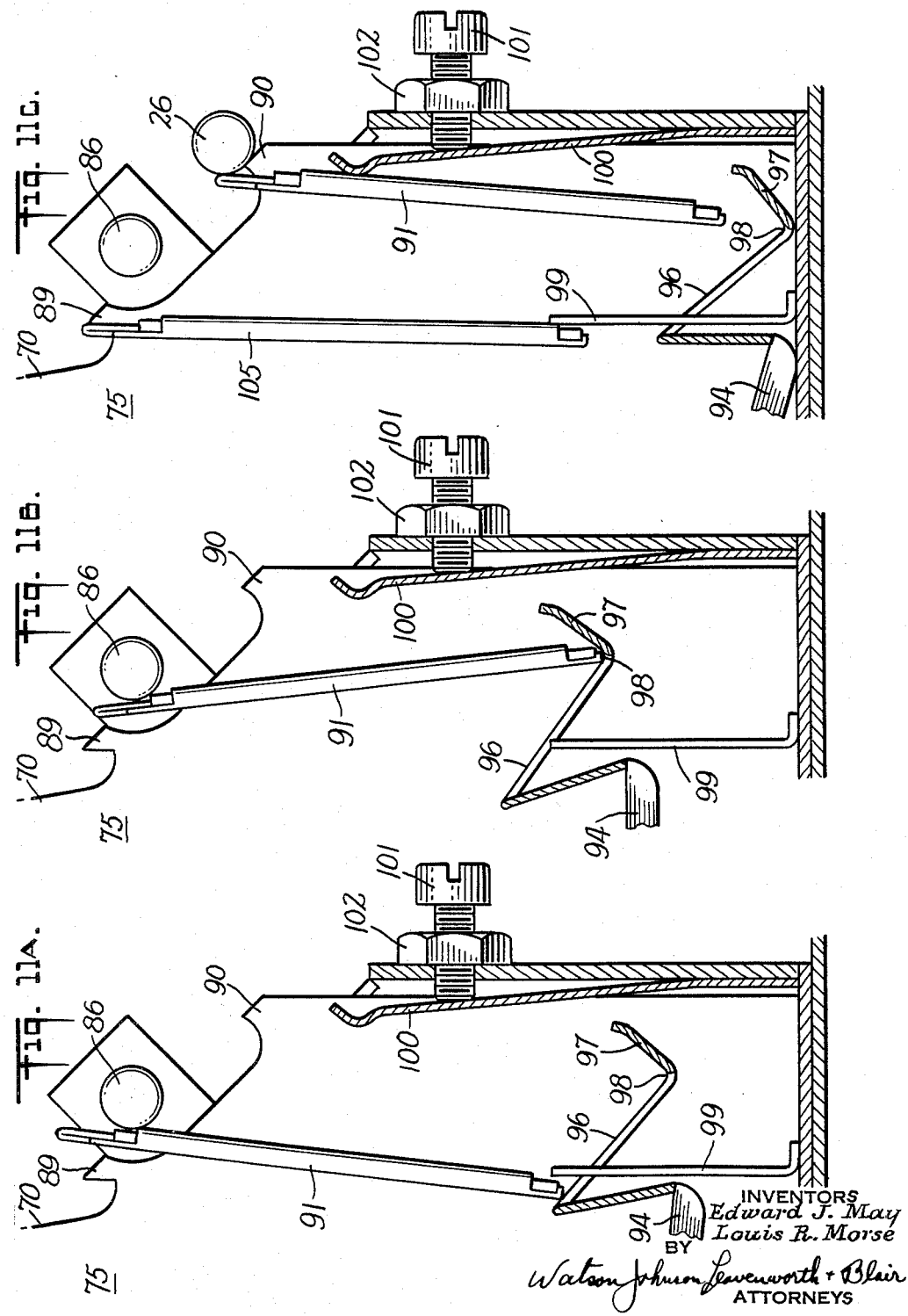

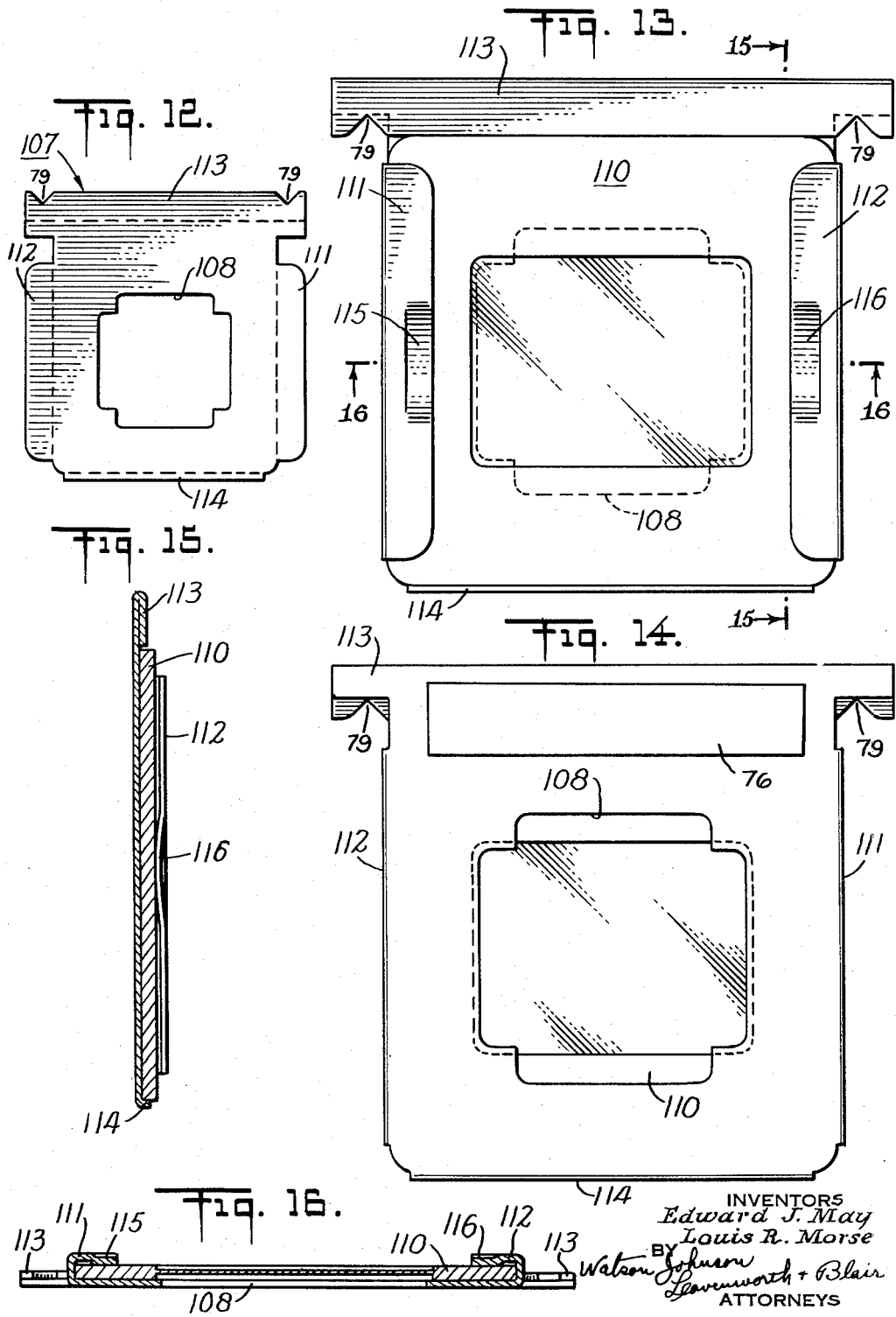

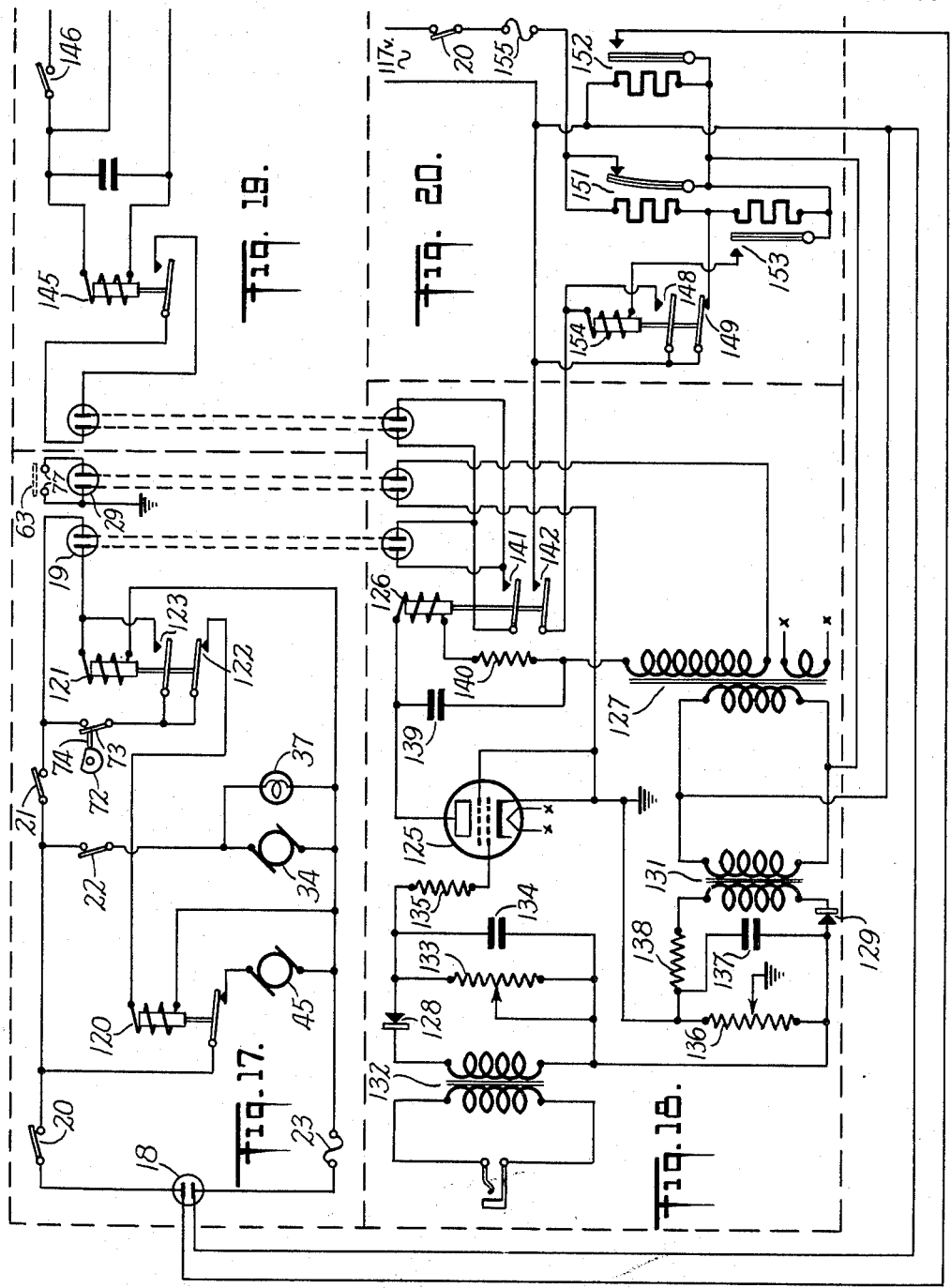

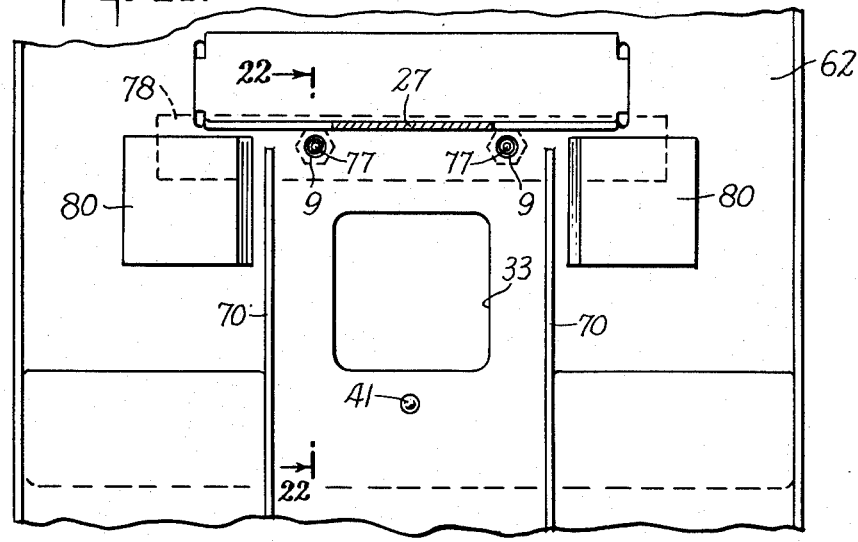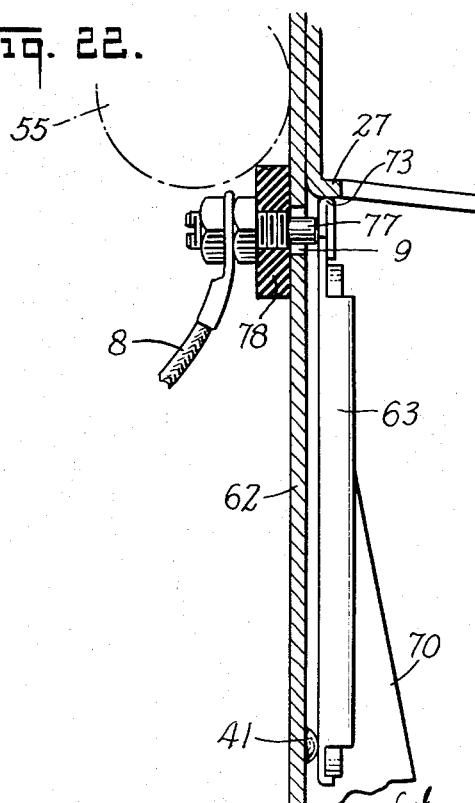

United States Patent Office 2,936,672
Patented May 17, 1960

2,936,672

AUTOMATIC RECYCLING SLIDE PROJECTOR

Edward J. May, Huntington, and Louis R. Morse, Hicksville, N.Y.

Application October 7, 1953, Serial No. 384,714

10 Claims. (Cl. 88—28)

This invention relates to still slide optical image projectors, and more particularly to improved recycling means for automatically projecting a series of slide transparencies in a continuous sequence. The invention provides means for selecting slides individually from one end of a slide containing magazine, means for automatically transferring each selected slide into projection position while at the same time releasing a previous slide from projection and restoring the released slide to the opposite end of the magazine, and means for progressively advancing slides within the magazine from one end thereof to the other end thereof.

An object of the invention is to provide a compact portable slide projector having automatic slide transfer means whereby a large number of slide transparencies may be sucessively projected in a continuously recycling sequence.

Another object of the invention is to provide means for remotely controlling the automatic transfer of slides into projection position, either manually or by speech controlled means, whereby the time during which each slide is projected may be varied at the will of an operator or lecturer.

A further object is to provide sound responsive means whereby the transfer of successive slides into projection position, and the duration of each projection, may be controlled automatically by a recorded sound track.

Another object of the invention is to provide an automatic single lens system projector in which the projected image of each succeeding slide is momentarily superimposed on the image of the preceding slide, whereby projection is continuous and the projected image of one slide dissolves into the image of the next succeeding slide at the moment of slide transfer.

Another object of the invention is to provide an improved automatic slide projector adapted for either horizontal front projection or for rear projection, and of sufficiently compact design to be suitable for use in a shadow box of small dimensions having a relatively large translucent screen.

Another object of the invention is to provide such compact automatic slide transfer means in a projector structure having a short focus projection lens system.

Still another object of the invention is to provide, in such an automatic projector, means for accurately centering the projected images on a screen and for exactly registering each successively projected slide with respect to the optical axis and projection plane of the projector optical system, whereby a plurality of such projectors may be employed for panoramic projection.

A still further object of the invention is to provide an improved slide transparency holder of durable construction and adapted for engagement by magnetic means.

An additional object of the invention is to provide improved means for cooling slide transparencies during projection.

Other objects and advantages of the invention will in part be obvious and will in part appear hereinafter. The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawings, in which:

Fig. 1 represents a perspective view of the completely assembled projector;

Fig. 2 represents, on a reduced scale, a side elevation of the complete projector, showing in dotted lines how the projector housing may be tilted when the protective cover is removed and also showing three different operating positions of the slide transfer means;

Fig. 3 represents a top plan view of the projector shown in Fig. 1, with the lens mount and forward portion of the slide transfer means broken away;

Fig. 4 represents a vertical cross-sectional view of the projector optical system and cooling system, taken along the line 4—4 of Fig. 3;

Fig. 4A represents a front view of a portion of the aperture plate, with the housing broken away, showing the protrusions against which slide holders are retained in spaced relation from the projection aperture;

Fig. 5 represents a detailed cross-sectional view of a portion of the optical system of Fig. 4, showing the manner in which a front surfaced angularly disposed mirror may be mounted on the projection lens for vertical projection;

Fig. 6 represents a rear sectional view of the internal structure of the projector taken along the line 6—6 of Fig. 2, with the various parts of the structure here illustrated full size;

Fig. 7 represents three side sectional views of the interior parts of the projector taken along the line 7—7 of Fig. 6, and showing three successive operating positions of the slide transfer means;

Fig. 8 represents three successive operating positions of the slide transfer timing cam as viewed along the line 8—8 of Fig. 6;

Fig. 9 represents a vertical front view of the projector, with a portion of the lens mount and transfer arms indicated in cross-section, as taken along the broken line 9—9 of Fig. 2;

Figure 10:
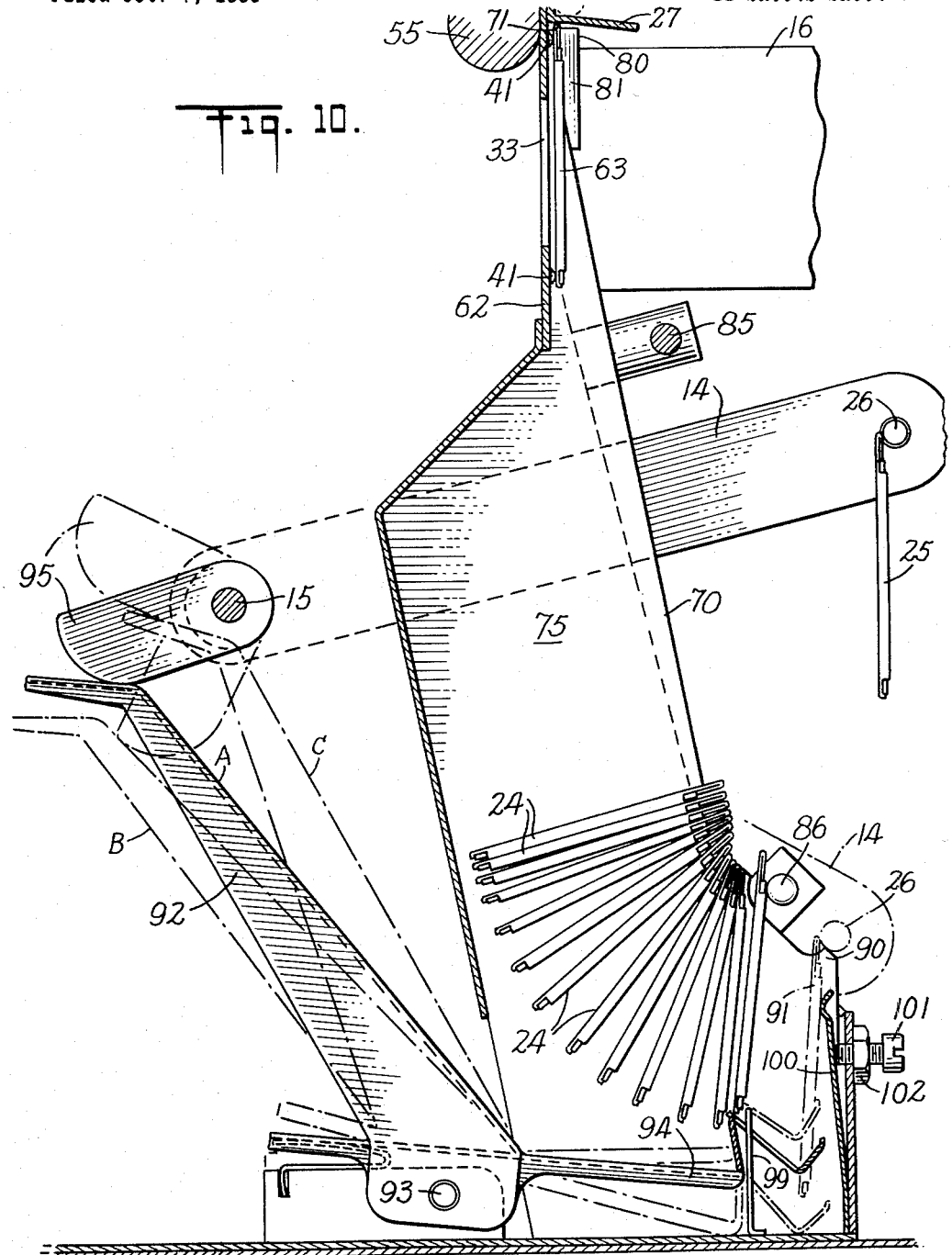
Fig. 10 represents a vertical cross-sectional view of the projector slide containing compartment taken along the line 10—10 of Fig. 9, showing in detail the slide selecting and transfer mechanism.

Fig. 11 represents three enlarged cross-sectional views of the slide selecting mechanism, illustrating in greater detail the structure at the lower end of the slide containing compartment and showing in three successive operating positions the manner in which the mechanism selects the lowermost slide holder within the compartment and moves the selected slide into engagement with the slide transfer means;

Fig. 12 represents a slide holder blank, after stamping, but before folding;

Fig. 13 is an enlarged front view of a completed slide holder assembly, showing a mounted slide transparency in place within the holder;

Fig. 14 is a rear view of the slide holder assembly of Fig. 13;

Fig. 15 is a cross-sectional view of the enlarged slide holder assembly, taken along the line 15—15 of Fig. 13;

Fig. 16 is a cross-sectional view of the enlarged slide holder assembly, taken along the line 16—16 of Fig. 13;

Fig. 17 is a schematic circuit diagram of the electrical components within the projector;

Fig. 18 is a schematic circuit diagram of a sound responsive electronic system for controlling the projector slide transfer mechanism of Fig. 17 by means of speech or other sounds, which sounds may be either recorded or picked up directly by a microphone;

Fig. 19 is a schematic representation of a sound reproducer reversing and synchronizing circuit which may be combined with the circuits of Fig. 18 and Fig. 17 for unattended continuous automatic projector operation;

Fig. 20 is a schematic diagram of a protective control system which may be combined with the circuits of Fig. 17, Fig. 18, and Fig. 19 to provide automatic disconnection of electrical power in the event of failure of any circuit or operating part of the projector and its associated control circuits;

Fig. 21 is a detailed front view of a portion of the projector showing one arrangement of electrical contacts for automatic synchronization of slides with sound; and Fig. 22 is a cross-sectional view, taken along the line 22—22 of Fig. 21, showing the manner in which the synchronizing contacts are insulated from the aperture plate of the projector housing.

In the projector of the invention, slides to be projected are mounted in individual metal holders formed of magnetic material such as high permeability iron or steel. Each of these slide holders is formed with a top portion which extends horizontally beyond the side edges of the slide, the extensions on each side being notched for slidable engagement with the upper edges of a pair of parallel guide flanges which form an inclined slide containing compartment in the front face of the projector housing, as illustrated by Fig. 1 of the drawings. The supporting guide flanges of the slide containing compartment are formed of non-magnetic material, preferably stainless steel. Because of the inclined plane in which the supporting guides lie, slide holders which are placed therein are caused by gravity to move toward the bottom of the slide compartment.

A pair of transfer arms 14—14 (Fig. 1 and Fig. 2) are mounted externally of the projector housing on opposite ends of a horizontal shaft 15 which is actuated by a motor-driven mechanism within the housing to cause the transfer arms to reciprocate about the axis 15 through an arc of approximately 85° from their lowermost position at C to their uppermost position at B, as indicated by broken lines in Fig. 2. Magnetic means 26—26 affixed to the outer extremities of arms 14—14 engage the upper edges of a slide holder in the bottom of the slide containing compartment when the transfer arms move to their lowermost position C, and as the motion of the transfer arms reverses from this extreme position the engaged slide holder is lifted from the bottom of the slide compartment and carried upwardly into registry with the projection aperture, as the transfer arms move into their uppermost position B.

Magnetic means within the projector housing engage the transferred slide holder to retain it securely in registry with the projection aperture during the next downward stroke of the transfer arms. As the next slide holder is lifted from the bottom of the slide compartment and moved into the projection path, in proximity to the projection aperture, other means within the projector housing momentarily disengage the previously registered slide holder allowing it to drop under the influence of gravity into the top of the slide compartment, whereupon the transfer arms complete their upward motion to bring the next succeeding slide holder into registry with the projection aperture. This next slide is likewise engaged by the magnetic means and retained in projection position for the duration of the next transfer cycle.

By this means, the image of each succeeding slide is momentarily superimposed upon the image of the preceding slide to achieve continuous projection without the annoyance of blanking the screen during the interval of slide change. Because each succeeding slide is first moved into the path of the projection beam before it is registered in the focal plane of the projection aperture, its projected image superimposed upon the image of the preceding slide is initially out of focus, thus producing a soft focus dissolve effect at the moment of transfer. When the preceding slide is released by momentary disengagement of the magnetic means, the succeeding slide is moved into exact registry at the focal plane to project a sharp image.

The slide transfer mechanism of the projector is operated by an electric motor-driven means within the projector housing as will be described in greater detail hereinafter. This mechanism may be driven by a spring motor or may be operated manually if desired. With a motor drive, as disclosed in the preferred embodiment, the projector may be set for continuous unattended operation, in which event the slides contained in the slide holder compartment will be successively projected in continuous recycling sequence.

Means are also provided for remote manual control, as by an electric push-button in combination with suitable relay switching means contained within the projector, whereby an operator or lecturer may control the slide changing operation at will to vary the duration of each slide projection. As an alternative means of control, a sound responsive electronic circuit is disclosed whereby the duration of each projection interval may be controlled by the spoken words of a lecturer or by any form of suitably recorded sound track.

Referring now in greater detail to the disclosure of Fig. 1 and Fig. 2 of the drawings, it will be seen that the projector comprises a metallic housing indicated generally at 10, which is pivotally mounted about a horizontal axis 11 passing through the base of a carrying case 12, the cover 13 of which, as indicated by a broken line in Fig. 2, may normally be removed for operation of the projector. Suitable locking means 28 holds the projector in any position to which it may be tilted, as indicated in Fig. 2 by the outline in broken lines.

A pair of parallel transfer arms 14—14 are pivotally mounted on shaft 15, extending horizontally through the projector housing, and are rotatable about the axis of shaft 15 to either of the two extreme positions B or C as indicated in dotted lines. A pair of horizontal arms 16—16 rigidly mounted to opposite sides of the housing 10 extend forwardly from the projector housing to support the projection lens mount 17.

Means for connecting an electrical power line to the projector are provided by a recessed plug 18, while a connection for a remote control circuit is provided by plug 19, and connection for automatic slide-sound synchronizing means is provided at 29. A master power switch is indicated at 20, a selector switch for selection of automatic or remote control at 21 and a separate light control switch at 22. A fuse for proper protection of the power circuit is indicated at 23.

A plurality of slide holders 24 adapted to receive individual slide transparencies are contained in an inclined vertical compartment 75 recessed within the front face of the projector housing, as is more clearly illustrated by Fig. 9 and Fig. 10 of the drawings. In the preferred embodiment of the invention, these slide holders 24 are formed of magnetic material. In Fig. 2, the upper edges of a number of such slide holders may be seen at 24, while a slide in transit is represented by the individual slide holder 25 suspended vertically from the magnetic member 26 which is affixed to the outer end of the transfer arm 14.

The optical system of the projector comprises a lamp housing 36 containing a projection lamp 37 and a pair of condenser lenses 38—38, all mounted within the upper portion of the projector housing 10. A projection lens 17 is carried by the forwardly extending horizontal arms 16—16. One of the advantageous features of the invention is that, by means of the structural arrangement of the slide transfer mechanism and the magnetic means for engaging and registering transferred slides at the projection aperture, a minimum of horizontal space is required between the projection aperture and the projection lens, so that the projection lens 17 may be of a shorter focal length than has heretofore been possible with other types of automatic projectors. This is of particular advantage when it is desired to use the projector in a shadow box assembly for rear projection onto a translucent screen. As the completed assembly requires a minimum of space, it may be conveniently installed in a show window for advertising display purposes.

The projector of the invention also embodies a unique cooling system as shown in Fig. 4 of the drawings. Beneath the lamp housing 36, which is completely open at the top and bottom, a blower fan 35 is mounted to force cooling air upwardly around the projection lamp 37 and outwardly through the top louvers 32. A truncated lower front corner of the lamp housing 36, as illustrated at 40 in Fig. 4, allows a portion of the cooling air from fan 35 to pass around the forward end of the lamp housing where this portion of the air then passes over the slide transparency and outwardly through annular spaces between the slide holder and the front face of the aperture plate. The limited surface contact between the slide holder 63 (Fig. 4) and the three contact points 41 (Fig. 4A) on the face of the aperture plate 62 reduces to a minimum the heat transfer by conduction from the projector to the registered slide holder at the aperture.

As illustrated by Fig. 4A of the drawings, three small protrusions which extend forwardly from the aperture plate serve to hold each successively transferred slide holder in spaced relation from the face of the aperture plate, to form annular spaces between the front of the aperture plate and the back of a registered slide holder, whereby the cooling air from fan 35 is allowed to pass outwardly, thereby preventing overheating of slide transparencies during the projection interval. The plane of the three protrusions 41 also determines the projection plane of slides registered in the projection aperture, thus assuring that each successive slide holder is positioned exactly the same distance from the projection lens 17.

As illustrated by Fig. 5 of the drawings, an angularly disposed front surfaced mirror 42 may be mounted on the forward portion of projection lens 17 to reflect vertical projection of the normally horizontal beam. A plurality of such angularly disposed mirrors may be mounted in a shadow box assembly to obtain sufficient "throw" for large image projection in a minimum of horizontal space.

Referring now to Fig. 6 of the drawings, the slide transfer drive motor 45 is shown coupled through a gear reduction train 46 to a rotatable crank 47 which operates through connecting rod 48 to reciprocally rotate cam 49. Cam 49 is mounted on and keyed to horizontal shaft 15 which carries the slide transfer arms 14—14 (Fig. 1 and Fig. 2) affixed to its opposite ends. Thus the slide transfer arms 14—14 are caused to move in an arc about the axis of shaft 15 as cam 49 is caused to oscillate by the reciprocal drive rod 48.

A helical compression spring 50, which surrounds the drive rod 48 and bears against the collar of the rotatable crank pin 52 on the crank wheel 47, limits the arc through which cam 49 rotates in one direction to provide an interval of dwell for the slide transfer arms 14—14 in the lowermost position C, as is more clearly illustrated by Fig. 7 of the drawings.

In Fig. 6, a blower motor 34 which operates fan 35 is shown mounted above the slide transfer drive motor 45 and gear box 46 in a position to force cooling air from fan 35 upwardly through lamp housing 36, and around the rear side of a transparency registered at the projection aperture, as hereinbefore described in reference to Fig. 4 of the drawings.

Referring now to the schematic representation of three successive operating positions as illustrated by A, B and C of Fig. 7, the manner in which crank wheel 47 operates through connecting rod 48 to impart reciprocatory motion to cam 49 may be better understood. In Fig. 7A, the slide transfer means are in their mid-position with the transfer arm 14 in position A, as shown by solid lines in Fig. 2. Throughout the several figures of the drawings, the operating positions A, B and C represent corresponding positions of the illustrated parts. Crank wheel 47 rotates continuously in a clockwise direction as long as the drive motor 45 (Fig. 6) is energized. As the connecting rod 48 moves downwardly from the position illustrated by Fig. 7A, counter-clockwise rotation is imparted to cam 49 until the transfer arms 14—14 are rotated to their uppermost position, as illustrated by Fig. 7B. As the slide transfer arms 14—14 reach position B, the connecting rod 48 passes over the center of the crank wheel 47, thus momentarily halting motion of the transfer arms 14—14 to provide a brief moment of dwell for these members in position B.

As the crank wheel 47 continues its clockwise rotation beyond the position illustrated by Fig. 7B, the connecting rod 48 commences to impart clockwise rotation to cam 49 which causes the transfer arms 14—14 to move downwardly from position B, through position A to the extreme lower position C, represented by Fig. 7C. Continued rotation of crank wheel 47 to the position illustrated by Fig. 7C compresses spring 50 until the connecting rod 48 and the crank pin 52 are aligned with the center of crank wheel 47. As clockwise rotation of crank 47 continues beyond the position of Fig. 7C, the compression of spring 50 is steadily reduced until the connecting rod end 53 again engages crank pin 52. During the interval while spring 50 is compressed and rod end 53 is disengaged from crank pin 52 as above described, no motion is imparted to cam 49, and the crank arms 14—14 dwell in their lowermost position C. As will be more particularly pointed out hereinafter, this period of dwell for the transfer arms 14—14 in position C facilitates the positive engagement of the magnetic transfer means with a slide holder selected from the bottom of the slide containing magazine.

Referring once again to the successive positions A, B and C illustrated by Fig. 7 of the drawings, the manner in which cam 49 operates to release each previously registered slide holder from the projection aperture as successive slides are transported into projection position will now be described. A powerful magnet 55 is mounted on the forward end of rocker arm 56 which is rotatable about the pivot 57, mounted on the side wall of projector housing 10. A counter-weight 58 on the opposite end of rocker arm 56 partially counter-balances the weight of magnet 55 so that relatively little force is required to lift rocker arm 56 in a counter-clockwise motion about pivot 57, as seen in Fig. 7. Magnet 55 may be a permanent magnet, or it may be an electro-magnet energized from the electrical power line which operates the projection lamp.

In the normal position of arm 56, as shown by solid lines in A, B and C of Fig. 7, the forward end of arm 56 rests upon a resilient pad 60, which is preferably of non-flammable, heat-resistant material such as asbestos, and the forward edge of magnet 55 is in close proximity to the inner surface of the aperture plate 62, adjacent to and above the projection aperture 33. In this position, the magnetic field from magnet 55 passes through the non-magnetic material of the aperture plate 62 and permeates the magnetic slide holder 63 which has been transported into proximity with the front face of the aperture plate, thereby attracting and holding slide 63 securely in registration at the projection aperture. The magnetic attraction between magnet 55 and a slide holder in registry position, such as 63 illustrated by dotted lines in Fig. 7A, is so great that the slide holder is retained in registry position against the front face of the projector housing with sufficient force that the projector may even be tilted forwardly for projection along a downwardly inclined angle if desired.

A notched arm 64 is pivotally mounted at 65 to rocker arm 56 at a position between pivot 57 and magnet 55. In the preferred embodiment of the invention, the force of gravity holds the lower end of arm 64 against the outer periphery of cam 49 as shown in all three operating positions of Fig. 7. If desired, a lightly tensioned spring may be employed to assure a sufficient clockwise force on the arm 64 about pivot 65.

A notch 66 on the periphery of cam 49 is adapted for momentary engagement with a corresponding notch 67 on arm 64. As the cam 49 rotates in a counter-clockwise direction from the position illustrated by Fig. 7A toward the position shown by the solid lines in Fig. 7B, notch 66 momentarily engages with notch 67 to impart a counter-clockwise lifting force to rocker arm 56, whereby the magnet 55 is momentarily elevated to the position shown by dotted lines in Fig. 7B. As the counter-clockwise rotation of cam 49 continues to the position shown by solid lines in Fig. 7B, notch 66 overrides notch 67 and the arm 64 is disengaged to allow magnet 55 to return under the influence of gravity to its normal operating position as shown by solid lines in all three views of Fig. 7.

During the momentary elevation of magnet 55, above and away from the projection aperture, as shown by the dotted line position in Fig. 7B, the previously registered slide holder 63 is released from its projection position because the air gap now existing between magnet 55 and the magnetic slide holder 63 is momentarily so great as to prevent the passage of sufficient flux to maintain the magnetic slide holder at the projection aperture. Therefore, the released slide holder 63 drops under the influence of gravity into the slide containing magazine 75 (Fig. 9) and is guided to the top of the slide stack by the inclined guide flanges 70.

It is to be understood that if an electro-magnet is employed to hold slides in registry at the projection aperture, rather than a permanent magnet 55 as illustrated by the preferred embodiment of the drawings, suitable electrical switching means may be provided to cooperate with a cam on the transfer arm shaft 15 so as to momentarily de-energize the electro-magnet in order to release a previously registered slide at the moment of slide transfer. Thus, an electro-magnet may either be lifted physically to release a slide, as is magnet 55, or it may be permanently mounted in a position adjacent the projection aperture and be momentarily de-energized to effect slide release.

Referring now to the three operating positions A, B and C illustrated by Fig. 8 of the drawings, the three successive operating positions of the transfer arm timing cam 72 will be seen as corresponding to the three operating positions of Fig. 7. The cam 72 is mounted on the horizontal shaft 15 in a position to engage a micro-switch 73, as may also be seen in Fig. 6 of the drawings. For purposes of clarity, the operating illustrations of cam 72 and switch 73 have been removed from the drawings of Fig. 7 and are separately shown in the three positions illustrated by Fig. 8. The manner in which cam 72 cooperates with switch 73 to interrupt the operation of the slide transfer mechanism is illustrated by the position of cam 72 in Fig. 8A where it is seen that as the transfer arms 14—14 move upwardly to the mid-position A, the cam 72 engages the pin 74 of micro-switch 73 to close the normally open circuit through switch 73. In this condition the drive motor 45 (Fig. 6) is turned off by energization of relay 120 (Fig. 17) through closure of cam switch 73, and the upward motion of transfer arms 14—14 is interrupted.

If the external control switch 21 (Fig. 1 and Fig. 2) is thrown to the "remote control" position, an automatic remote control circuit, as illustrated in Fig. 17, will be brought into operation, as fully described hereinafter.

If the control switch 21 is in the other position (marked "Automatic" in Fig. 1 and Fig. 2), the motor 45 will remain energized, and the slide transfer arms 14—14 will continue their reciprocal movement between positions B and C without interruption. When switch 21 is in the "remote control" position, cam 72 (Fig. 8) will be effective to interrupt the upward reciprocatory motion of transfer arms 14—14 as illustrated by Figs. 7A and 8A of the drawings. In this condition, the slide changing cycle may be controlled remotely either by operation of a manual push-button, or by the sound responsive electronic circuit as will be hereinafter described in reference to Figs. 17, 18 and 19 of the drawings.

Reference is now had to Fig. 9 and Fig. 10 of the drawings which disclose the slide containing compartment or magazine 75, recessed in the front face of the projector housing 10. A plurality of slide holders 24 are shown in place in the lower portion of the slide containing magazine 75, while an individual slide 63 is registered at the projection aperture 33 in position for projection. Slide 63 is held securely against the raised portions 41 of the front face plate 64 by the magnetic attraction of magnet 55 located within the projector housing and above the projection aperture as shown by Fig. 10. A pair of electrical contacts 77—77 (Fig. 21 and Fig. 22), mounted on the aperture face plate 62, but insulated therefrom, establish electrical contact with the magnetic metal slide holder 63 and cooperate through external electrical circuits, to be described hereinafter in reference to Fig. 17, Fig. 18 and Fig. 19 of the drawings, to provide automatic synchronization between a recorded sound track and a series of projected slides.

It will be noted in Fig. 9 and Fig. 10 that the parallel inclined guide flanges 70—70 extend from the lower end of the slide magazine 75 upwardly to join the face plate 62 above the projection aperture 33. The horizontal space between the flange 70—70 is slightly greater than the width of the slide holders, as illustrated by the spaces 78—78 between flanges 70—70 on either side of registered slide holder 63, so that the slides are loosely guided therebetween. The spaces 78—78 on either side of the slide holders reduce friction between slide holders and guide flanges to facilitate free and easy motion of slides within the guide flanges as slides are released from registry at the projection aperture.

Inverted V notches 79—79 in the lower edges of the horizontal hanger arms, which extend laterally from the top edge of each slide holder, rest upon the guide flanges 70—70 and cooperate therewith to guide released slides from the projection position to the top of the slide stack 24.

To assure proper lateral centering of registered slides with respect to the projection aperture, guide blocks 80—80 are mounted on the front face of the aperture plate 62 on either side of the guide flanges 70—70 and above the projection aperture 33 to engage the hanger ends of slide holders in registry. Beveled edges 81—81 of the guide blocks 80—80 engage and guide the slide holders to the correct horizontal center position as each slide holder is drawn into registry position against the face of aperture plate 62 by the magnetic attraction of magnet 55.

Vertical registry of slides at the projection position is controlled by upper guide plate 27 which is slidably mounted in vertical guides 82—82 and is exactly positioned by manual adjustment of the vertical adjustment screw 83. Screw 83 opposes the upward force of leaf spring 84 to hold the upper limit guide flange 27 rigidly in the desired position. The upper edge of each slide hanger bar, as 71 in Fig. 9, is drawn firmly against the vertical limit flange 27 through the magnetic attraction of internal magnet 55.

A horizontal guide bar 85 is provided, as shown in Fig. 9 and Fig. 10 extending below the aperture plate and over the parallel guide flanges 70—70, to prevent the bottom edge of a slide in transit from possibly swinging into the path of the previously released slide as the latter is returned to the top of the stack 24. Near the bottom of the slide magazine 75, similarly appearing guide bars 86—86 are provided to facilitate the selection of an individual slide holder from the bottom of the magazine stack, as will be described in detail hereinafter.

As may be seen in Fig. 10, and the three views of Fig. 11, the lower edges of guide flange 70—70 are formed into slide retaining hooks 89—89 and 90—90. The bulk of slide holders contained in the magazine compartment 75 rest upon the first hooks 89—89, while the bottom slide, which is individually selected from the stack, is moved into engagement with hooks 90—90 as shown by the dotted line representation of slide 91 in Fig. 10.

A slide selecting rocker arm 92 (Fig. 10) is rotatable about the horizontal axis 93 to operate its lower extremity 94 in a manner to select an individual slide from the bottom of the magazine stack as will hereinafter be described in greater detail with reference to the three views of Fig. 11. Cam 95 mounted on horizontal shaft 15 reciprocates with the transfer arms 14—14 and bears against the upper extremity of rocker arm 92 to elevate the lower extremity 94 as the slide transfer arms 14—14 are moved upwardly.

Referring in greater detail to Fig. 11 of the drawings, the operating sequence by which an individual slide holder is selected from the bottom of the slide magazine and brought into engagement with the magnetic transfer arms will now be described. When the slide transfer mechanism is in position A as shown by solid lines in Fig. 10, the lower portion of rocker arm 94 is elevated to its mid-position as shown more clearly by the enlarged detailed drawing of Fig. 11A.

As is illustrated in cross-section by Fig. 11A the lowermost extremity of rocker arm 94 is formed substantially in a Z shape fold comprising a downwardly inclined portion 96 joined with an upwardly inclined portion 97 forming therebetween a V groove 98. An upwardly extending vertical stop 99, which is rigidly mounted to the base of projector housing 10, passes through a rectangular hole in the inclined portion 96 of the slide selecting rocker arm 94, as is more clearly illustrated by the cutaway lower portion in the drawing of Fig. 9.

The bottom slide of the stack 24 contained in the magazine 75 hangs normally on the first flange hooks 89—89 and rests against the stop 99, as shown by slide 105 in Fig. 11C. However, when the rocker arm 94 is elevated to the position illustrated by Fig. 11A, the inclined portion 96 lifts the bottom slide above the restraining shoulders of hooks 89—89, allowing the upper portion of this slide (91 in Fig. 11A) to rest against the lower horizontal guide bars 86—86.

As upward motion of the rocker arm 94 continues to the uppermost position B, the inclined portion 96 rises above the top of the forward limiting member 99, allowing the bottom edge of the selected slide holder 91 to advance down the inclined portion 96 until it comes to rest in the groove 98, as illustrated by Fig. 11B.

As the rocker arm 94 moves downwardly to its lowermost position, illustrated by Fig. 11C, the top edge of the selected slide holder 91 passes beneath the horizontal guide bars 86—86 and the selected slide holder 91 comes to rest upon the lower flange hooks 90—90 in a position to be engaged by magnetic transfer members 26—26 which come to rest adjacent to hooks 90—90 in the B position. As the magnetic transfer arms 14—14 again begin to move upwardly, carrying therewith the magnetic transfer members 26—26, so also does the slide selecting rocker arm 94 move upwardly in such manner that the selected slide holder 91 is lifted by the groove 98, and thus given a mechanical boost at the start of its upward journey in contact with the magnetic members 26—26.

To eliminate any tendency of a selected slide to oscillate when hanging upon the lower flange hooks 90—90, and to assure that the bottom edge of such slide holder will be engaged by the rising groove 98 of rocker arm 94, a leaf spring member 100 is provided as illustrated in Fig. 11 to limit the forward motion of a selected slide when transferred to hook 90. Correct positioning of forward limit spring 100 is achieved by means of adjustment screw 101 which is threaded through the lower front portion of the projector housing 10 and is held in any position to which it is adjusted by locking nut 102.

Referring once again to Fig. 10 of the drawings, it will be noted that the bottom edges of the slide holders 24 in the lower end of the slide magazine compartment 75 are separated from each other by appreciable spaces while the top edges of each slide are in intimate contact with the corresponding edges of adjacent slides. This fanning separation of the bottom edges of the slides results from the difference in slide thickness between the top, or hanger edge, and the slide containing portion of each slide holder. This means of separating the slide holders to facilitate the automatic selection of individual slides, as previously described in reference to Fig. 11 of the drawings, is an important feature of the invention and results from the particular configuration of slide holder as illustrated by Fig. 12 through Fig. 16 of the drawings.

Reference is now made to Fig. 12 of the drawings, which illustrates the outline of a sheet metal stamping from which the slide holder of the invention is formed. The dotted lines in Fig. 12 represent lines along which the metal stamping is folded to produce the finished slide holder. A square cross shaped hole 108 stamped through the center of the blank 107 enables the slide holder, when completed, to accommodate either vertically mounted or horizontally mounted slide transparencies without masking any part of either type of transparency.

Fig. 13 illustrates, on a larger scale, a completed slide holder as formed from a blank according to the outline of Fig. 12 when the four edges are folded along the dotted lines of Fig. 12. The slide holder of Fig. 13 is shown containing a horizontally mounted slide transparency 110 which is normally placed in the slide holder by sliding the mounted transparency over the folded top flange 113 and between the spaced side flanges 111 and 112 until the bottom edge of the mounted transparency 110 rests against the bottom flange 114 of the slide holder.

As illustrated by the cross-sectional view of Fig. 15, the center portions 115 and 116 of flanges 111 and 112 are indented to provide a firm grip for securing the mounted slide transparencies within the slide holder. As is also illustrated by Fig. 15, the thickness of the slide holder at its top or hanging flange 113 is very substantially less than the thickness of the holder at the side flanges 111 and 112. This difference in thickness of the holder at these parts, combined with the position of the hanging support flange 113, as illustrated by Fig. 15, produces the desired fanning separation between the bottom edges of the lowermost slide holders when a quantity of holders are installed in the slide containing magazine, as illustrated by Fig. 10 of the drawings.

Fig. 14 illustrates a rear view of the enlarged slide holder assembly of Fig. 13 showing the manner in which the square cross-shaped cut-out portion of the slide holder accommodates either horizontal or vertical transparencies. The rectangular area 76, in Fig. 14 represents a strip of surface insulating material such as cellulose acetate adhesive tape, or insulating lacquer, which may be applied to one or more of the slide holders for the purpose of effecting automatic recycling, as will be described hereinafter.

Fig. 16 illustrates in cross-section, as viewed from the bottom, the position of the slide transparency mounted in the slide holder, and shows also the relationship between the upper or hanging flange 113 and the slide containing flanges 111 and 112 by which the desired fanning separation between slide holders is obtained.

It is contemplated that twin slide holders having the same general features of construction as the single slide holder illustrated by Fig. 12 through Fig. 16 may be employed for holding "stereo" slides in a projector adapted for the projection of steroscopic, or three-dimensional images. The projector of the invention is particularly well suited to the projection of steroscopic images, by reason of its accurate slide positioning means as hereinbefore described. In this alternative embodiment the slide holder of the invention is formed with a sufficiently wide horizontal dimension to receive a mounted pair of stereo transparencies, thet slide containing magazine 75, the projection aperture 33 and the slide transfer means are of correspondingly increased width, and a pair of matching projection lenses, as 17 (Fig. 1), are mounted in alignment with the optical axes of the stereo transparency apertures.

With reference to the magnetic slide transport members 26—26, affixed to the forward ends of transfer arms 14—14 (Fig. 1, Fig. 2, Fig. 10 and Fig. 11), it is to be understood that electro-magnetic means may be employed in lieu of the permanent magnet bars 26—26. The invention contemplates the use of such electro-magnetic means which may either remain continuously energized during projector operation, or may be alternately energized and de-energized in timed relation to the slide transfer cycle.

Reference is now had to the schematic circuit diagrams of the projector electrical system and its associated control devices. Fig. 17 represents the internal electrical circuit of the projector. By selective operation of switch 21, this circuit enables the projector to be operated continuously without attendance, or by means of an external connection to plug 19 the period of presentation of each slide at the projection aperture may be remotely controlled, either by a manually operated push-button switch (not shown), or by a sound responsive control unit. The circuit for a sound operated remote control device is disclosed by Fig. 18, while means for automatically synchronizing a recorded sound track with a series of slides to be projected are disclosed by Fig. 19. Fig. 20 is a schematic representation of protective means for automatically interrupting operation of the projector and its associated control circuits in the event of failure of any circuit.

Referring now in greater detail to the circuit diagram of Fig. 17, the projector comprises the main drive motor 45, two relays, 120 and 121, one cam operated microswitch 73, a main power switch 20, a selector switch 21, a switch 22 for operating fan motor 34 and lamp 37, and a connector 19 for plugging in either a manually operated push-button switch or for making connections to the electronically operated sound controlled circuit of Fig. 18. Connector socket 29 provides remote cable connection to the automatic slide-sound synchronizing circuit of Fig. 18. The projector motor 45 derives its power through the normally closed contacts of relay 120. If the selector switch 21 is in open position, as illustrated by Fig. 17, the drive motor 45 will operate continuously so long as the main power switch 20 remains closed.

For remote control the selector switch 21 is closed, and the operation of drive motor 45 is under the control of relay 120 which may be energized from the main power line by closure of the cam-operated switch 73. Switch 73 is normally open and is closed only by operation of cam 72, as described hereinbefore in reference to Fig. 8.

The operating coil of relay 121, in series with the connections to remote control plug 19, is normally de-energized and only operates when a momentary short circuit is connected across the terminals 19, either by a push-button or by the sound control circuit of Fig. 18. Contacts 122 of relay 121, which are connected in series with relay 120 as illustrated by Fig. 17, are normally closed. When the cam switch 73 is closed by operation of cam 72, relay 120 is energized to open its contacts and stop the operation of motor 45. Cam 72 is located on the transfer arm shaft 15 which is rotated reciprocally through an arc of approximately 85°, as described in reference to Fig. 7 and Fig. 8. By a set screw adjustment, cam 72 may be positioned on shaft 15 so as to stop the operation of motor 45 when the transfer arms 14—14 are at any desired position. Preferably the transfer arms 14—14 are stopped at position A (Fig. 1, Fig. 2 and Fig. 7), just before the slide in transit is moved into the optical path of the projection beam.

When the motor 45 is stopped as described above, electrical energy from the power line is applied to the movable contact 123 of relay 121 as the cam switch contact 73 is closed. The coil of relay 121 is in series with plug 19 to which the remote control means may be connected. When these terminals 19 are short-circuited by the remote control push-button switch, the coil of relay 121 is energized to open contacts 122 and close contacts 123. Relay 121 is held in operated condition through closure of contacts 123 and closed switch 73. By means of this relay holding circuit, the projector slide transfer means may be restored to operation through only a momentary contact across the remote control line connected with terminals 19.

Both contacts 122 and 123 are held operated, with contact 122 open and contact 123 closed, as long as the cam switch 73 remains closed. The opening of contact 122 removes energizing power from relay 120, and the motor 45 starts to operate. As cam 72 continues to rotate, cam switch 73 again becomes open, removing power from relay 121 and allowing this relay to return to its normal position, as illustrated by Fig. 17, with contacts 122 closed and contacts 123 open. Inasmuch as there is no power connected to contacts 122 at this moment, with cam switch 73 open, relay 120 remains unenergized and its contacts remain normally closed to continue the operation of motor 45. This condition continues until motor 45 has rotated cam 72 to a position where switch 73 once again becomes closed to energize relay 120. Relay 120, re-energized, operates to stop the motor 45 as described above. With cam switch 73 closed, power is once again available at contacts 123 to hold relay 121 whenever a momentary closure is made across the remote control terminals 19. Thus, a lecturer or operator may restart the slide change cycle at will by the simple means of a remote push-button control.

Reference is now made to the sound operated remote control circuit of Fig. 18, which is essentially a voice controlled electronic relay. The circuit of Fig. 18 employs a Thyratron type tube 125, a plate circuit relay 126, power transformer 127 and a pair of germanium diode rectifiers 128 and 129. Heater and plate potentials are both derived from the same transformer 127, while the secondary voltage of another transformer 131 is rectified by germanium diode 129 to provide grid bias potential.

A control voltage of audio frequency is applied to the circuit of Fig. 18 through a suitable matching input transformer 132. The audio frequency voltage appearing across the secondary of transformer 132 is rectified by germanium diode 128, and the rectified pulsating D.C. potential therefrom is fed into an RC timing circuit comprising resistor 133 and capacitor 134. The time constant of this RC circuit may be varied by means of the variable resistor 133. The output potential from the RC timing circuit is polarized to apply a negative voltage to the control grid of Thyratron 125, through an appropriate grid resistor 135. The Thyratron input circuit is completed through the cathode connection to the variable bias control resistor 136.

The output of the bias transformer 131 is rectified by germanium diode 129 and connected as illustrated in the circuit of Fig. 18 so as to apply a negative bias to the control grid of Thyratron 125. The rectified output from diode 129 is fed into a filter circuit comprising variable resistor 136 and capacitor 137. A series resistor 138 limits current through the diode 129. Variable resistor 136 across the output of this bias circuit forms a voltage divider by which the bias potential may be adjusted to a desired value.

The output, or plate circuit, of Thyratron 125 includes the relay 126 with its associated timing circuit comprising capacitor 139 and resistor 140. Resistor 140, in series with the relay coil 126, limits plate current through tube 125. The capacitor 139 is of a sufficient capacity to smooth out the pulsating D.C. voltage of the plate circuit so as to assure smooth and positive operation of relay 126. The time constant of this circuit must, of course, be less than the time constant of the input RC circuit 133 and 134.

Operation of the circuit of Fig. 18 is as follows: Before audio frequency voltage is applied to the input of transformer 132, the bias control 136 is adjusted to provide a negative bias potential which is just insufficient to prevent ionization of tube 125. As the Thyratron 125 is of the negative control type, this tube will be normally ionized and the plate circuit will be drawing current through relay 126. When the audio frequency control voltage is then applied to the input of transformer 132, the output voltage of transformer 132 in series with the bias potential supply will increase the negative bias voltage at the grid to a point where the tube 125 will be deionized and the flow of plate current therethrough will cease.

By varying the bias adjustment 136, the margin between audio signal level required to start and stop ionization may be varied. The closer the bias voltage is adjusted to the cut-off value, i.e., to the value which prevents ionization of Thyratron 125, the less audio voltage will be required to stop ionization. It will be apparent that if appreciable background noise is present in the sound being reproduced, more margin must be provided for the grid bias, to prevent inadvertent operation of the circuit by the noise signal. Also, to compensate for the limited filtering action of capacitor 137, and to assure smooth but sensitive control through the input circuit, the secondary of the bias supply transformer 131 should be properly phased with respect to the plate supply transformer 127.

When the circuit of Fig. 18 has been adjusted as described above, it will respond to audio frequency control signals which may be derived either from a recorded sound track or from a direct microphone pick-up. As the combination of projector and control circuits are capable of entirely automatic and unattended operation, the description which follows will refer to control by a sound reproducer. This may be either a recorder-reproducer combination, or merely means suitable for reproducing a previously recorded sound track. It will be apparent that the narration or sound accompaniment may be recorded either on a disk, film, magnetic wire or tape. For reasons which will be apparent hereinafter, we prefer to use a twin track automatic reversing magnetic tape reproducer.

To afford continuous unattended operation with recorded narration or sound accompaniment, two sound tracks are preferably recorded in opposite directions and on opposite edges of a magnetic tape. The separate narration or accompanying sound effects are recorded for each slide, with the narration to accompany each slide separated from the narration for the succeeding slide by a silent pause of approximately three seconds. This interval of silence is recommended to prevent inadvertent or unintended operation of the projector during normal pauses in the speech of an average narrator. It will be understood that the delay interval required for operation of the slide change control may be adjusted for either longer or shorter intervals by means of the variable resistor 133. If it should be desired to provide continuous overall background music to continue during the interval of slide change, with successive periods of narration superimposed upon the background recording, it is only necessary to adjust the bias control resistor 136, as described above, to set the proper margin of bias to accommodate the difference in level between background music and narration.

In preparing the recorded sound track on tape, it is necessary to reverse the direction of recording when one half of the total time of narration has been recorded, so that the remaining half of the sound record is recorded in the opposite direction and on the opposite edge of the twin track magnetic tape. Tape reversing means, which may be in the form of small segments of metallic foil, are affixed to opposite edges of the tape to mark the end of recording in each direction. These foil segments may engage contacts which bear against the record tape (as illustrated schematically in Fig. 19 of the drawings) to effect automatic tape reversal and to switch the pick-up head from one tape edge to the other in the sound reproducer. Other means of tape reversal may be employed, as for example a distinctive pulse may be recorded magnetically at the opposite extremes of the sound record, or a non-reversing continuous loop of sound record may be employed if desired. However, for circuit simplicity, and for greater reliability of control, we prefer to use metallic foil reversing contacts as described.

When the output audio frequency signal from the sound reproducer is connected to the input of transformer 132 in Fig. 18, the sum of the rectified audio frequency signal voltage and the previously adjusted bias potential is sufficient to prevent ionization of the Thyratron 125 and to interrupt the flow of plate current therethrough. So long as an audio frequency signal of sufficient potential is applied to the input transformer 132, and for three seconds following the removal of such signal (or for whatever period of time delay resistor 133 has been set), the contacts of plate relay 126 remain open and the projector motor 45 (Fig. 17) remains inoperative. When the sound narration for a particular slide is concluded, and the predetermined delay period of pause has ensued, the negative grid potential applied to the Thyratron 125 is reduced to the point where the Thyratron becomes ionized and relay 126 is operated by the flow of plate current therethrough.

Operation of relay 126 closes contacts 141, which are connected by remote control cable to the contacts of plug 19 (Fig. 17) whereby the projector motor 45 is energized as hereinbefore described. With the audio frequency voltage from the sound record once again applied to the input transformer 132 of the remote control circuit Fig. 18, the sum of negative potentials applied to the grid of Thyratron 125 deionizes the Thyratron and interrupts the flow of plate current through relay 126. With relay 126 unoperated contacts 141 are opened and circuits of Figs. 17 and 18 are conditioned for the next slide transfer cycle.

Synchronization between picture and related sound is automatically checked once in every complete cycle of slides sequentially projected. This is accomplished by providing one specially insulated slide holder in each set of slides, which special slide may be uniquely marked by an identifying color if desired. Whereas each of the remaining slides is contained in a metallic holder of good electrical conductivity, the holder of the special slide (hereinafter referred to as the synchro slide) is coated with insulating lacquer, or other suitable insulating material, for example a strip of cellulose acetate adhesive, may be applied to the back surface of the synchro slide as illustrated by the area 76 in Fig. 14. As illustrated by Fig. 21 and Fig. 22 of the drawings, a pair of electrical contacts 77 are provided adjacent to the projection aperture and insulated from the aperture plate 62. These contacts which are connected in parallel, form an electrical circuit through the metallic frames of the regular slide holders to the grounded frame of the projector, as illustrated schematically in Fig. 17. By a suitable cable 29 the contacts 77 are connected with the sound control unit (Fig. 18) in series with the ground end of Thyratron 125 and the plate circuit thereof, as illustrated schematically in the remote control circuit Fig. 18. When there is no slide at the projection aperture, or when the insulated synchro slide is in projection position, the Thyratron 125 (and consequently the audio input signal) exercises no control over projector operation.

If the synchro slide is placed on top of the stack in the projector magazine 75, which will make the synchro slide the last slide to be projected before repetition of the entire magazine slide cycle, the projector motor 45 cannot be started by the Thyratron control circuit of Fig. 18 during the interval when this last slide is being projected. In this condition, interruption of the audio frequency control signal applied to the input transformer 132 will not effect removal of the synchro slide, nor will the next successive slide be moved into projection position. However, since the synchro slide is the last slide in the magazine load, when its accompanying recorded narration is terminated, the sound reproducer should be prepared to reverse automatically. If the sound track is in proper synchronism with the projected series of slides, the metallic reversing foil which is cemented to one edge of the record tape as hereinbefore described, will not only effect reversal of the tape in the reproducer, but the reversing contacts which are shorted by this foil will also complete a circuit to operate isolation relay 145 (Fig. 19). Contacts of relay 145 are connected to contacts 141 of the Thyratron plate relay 126 (Fig. 18) and are in parallel with the terminals 19 of the projector (Fig. 17), whereby closure of relay contacts 145 causes operation of projector motor 45 to transfer the next slide (the first slide of a series) into projection position as the sound track commences to reproduce the first recorded narration.

If for any reason the recorded sound is not synchronized with the synchro slide as projected, this synchro slide will remain in projection position until the end of the sound track is reached and the reversal foil operates as above described to effect replacement of the last slide (the synchro slide) by the next succeeding, or first, slide immediately prior to commencement of the first recorded narration. By means of this automatic synchronism between the first slide and the first recorded sound, the necessity for care in threading the sound tape and starting it at a predetermined fixed point is eliminated. Incorrect threading of the sound record tape will be automatically compensated for on the first run through the series of slides in the magazine.

Reference is now made to Fig. 20 of the drawings, wherein are disclosed protective circuits for automatically interrupting operation of the projector and its associated controls in the event of any possible cause of failure as, for example, loss of synchronization between sound and related picture presentation, complete sound failure for any reason, or projector failure such as might result from a slide not being presented at the projection aperture. The circuit of Fig. 20 comprises three thermal-time-delay relays 151, 152 and 153, together with a magnetic relay 154. For a complete understanding of the operation of this circuit, a step-by-step description will be given commencing with the instant that power is applied by turning on the main switch 20 of the projector. It will be noted that main switch 20 is a double-pole, single-throw switch, of which one pole is represented schematically in the circuit of Fig. 17 while the other pole appears in the schematic diagram of Fig. 20. It is contemplated that power for the projector and all of its associated control circuits will pass through and be controlled by switch 20 and the protective circuit of Fig. 20.

When the main switch 20 is closed, power is applied to the heater element of relay 152 through the normally closed contacts of relay 151, and to the heater elements of relays 151 and 153 through a series circuit comprising the contacts of relay 151 and the normally closed contacts 149 of relay 154. Electrical power is also applied to the sound reproducer, sound amplifier and sound control circuits through the contacts of relay 151. A brief warm-up period is required for the electronic circuits of the reproducer (not shown) and for the sound control circuit of Fig. 18, as well as for the thermal units of all delay relays in Fig. 20. Normally open relays 152 and 153 warm up and operate after a 30 second delay interval to close their contacts. Relay 152 operated, applies power to the projector motor 45 and to the sound reproducer motors (not shown). Simultaneous operation of relay 153 closes its normally open contacts to condition relay 154 for operation, but relay 154 does not yet operate because its control contacts 148 are open and a circuit is not yet completed therethrough to the other side of the power line. Relay 151 requires a time delay of 120 seconds before it operates to open its normally closed contacts.

Although the motor of the sound reproducer (not shown) is now operating and an audio frequency signal is being applied to the input circuit of transformer 132 (Fig. 18), projector motor 45 is inoperative due to the fact that the plate circuit through relay 126 remains open. Assuming that the sound tape has been loaded into the reproducer so as to first reproduce the last minute or minute and a half of the recorded narration or accompaniment, which is the recommended starting procedure, after a short while the reversal foil, referred to in the description of Fig. 19 above, engages the reversing contacts (Fig. 19) to start the first slide presentation at the same time that the first portion of the recorded sound track is reproduced. Thereafter, the first pause in the recorded sound track operates the remote control circuit of Fig. 18 as described above to energize the projector motor 45 which derives the transfer arms 14—14 to move the second slide into projection position, as narration for this second slide commences.

When the Thyratron plate circuit relay 126 is energized by the interruption of recorded sound as the tape reverses, approximately 90 seconds after closing of the main starter switch, relay 126 closes its contacts 142 in parallel with contacts 148 of relay 154 to energize and hold relay 154 in operated condition, thereby holding open contacts 149. It will be noted that contacts 149 of relay 154 are in series with the heater elements of relays 151 and 153, so that these elements start to cool when contacts 149 open.

Although thermal relay 151 requires 120 seconds to operate, it recycles in 25% of this time, i.e., it requires only 30 seconds to cool. Similarly, thermal realy 153, which requires 30 seconds to operate, will recycle in 50% of its operate time, or only 15 seconds. Therefore, with contacts 149 of relay 154 held open for 15 seconds, relay 153 will open its contacts, thereby causing relay 154 to be de-energized and to open contacts 148, which conditions the circuit of Fig. 20 for the next slide change.

Contacts 149 of relay 154 are now closed, and the thermal elements of relays 151 and 153 commence to warm up again. Within 30 seconds relay 153 is again operated, making power available to relay 154 when contacts 142 of the Thyratron plate relay 126 are once again closed by a slide change.

It is to be understood that the relays 151, 152, 153 and 154 of Fig. 20 exercise no control over the normal presentation of successive slides and sound, but that the sound control circuit of Fig. 18 can effect slide change at any time, depending solely upon the presence of pause intervals in the sound record. The only limitation imposed by the protective circuit of Fig. 20 is that there must be a slide change in less than the 120 second delay period for which relay 151 is adapted. Of course, it will be understood that a relay having a longer delay period may be employed, if it should be desired to present any slide for a longer period of time. The only purpose of the protective circuit of Fig. 20 is to remove power from the projector and its associated control circuits in the event of any extraordinary failure.

Having described normal operation of the projector control circuits, we will now describe the operation of the protective circuits in the event of projector failure, as for example, if the slide change mechanism should jam or get out of order for any reason so that no slide is presented to the projection aperture. Under this condition, the Thyratron plate circuit of tube 125 (Fig. 18) is open and its associated relay 126 is not energized. Contacts 141 and 142 of relay 126 are open, and projector cam switch 73 interrupts operation of the projector motor as hereinbefore described. If contacts 149 of relay 154 (Fig. 20) should be open when the projector trouble develops, these contacts 149 will become closed within 15 seconds as thermal relay 153 will cool and recycle itself in this period, thus opening the operating circuit of relay 154 to close contacts 149. With contacts 149 of relay 154 closed, the thermal element of relay 151 commences to warm up, and within 120 seconds, relay 151 will operate to open its contacts and thereby remove power from all components of the equipment.

Assuming that the projector continues to operate properly, but that a failure develops in the sound system, as for example if the tape breaks or an amplifier tube burns out, the operation of the protective circuits in this emergency will now be traced. With absence of an audio frequency signal from the input transformer 132, the Thyratron control tube 125 (Fig. 18) will be ionized, plate circuit relay 126 will be operated, relay 154 will operate to open contacts 149 (Fig. 20), and energy will be removed from the heater element of relay 153 which will cool in 15 seconds and thus open its contacts. With the contacts of relay 153 open, relay 154 will be released, closing contacts 149 and causing relay 153 to re-establish its contact within 30 seconds. As contacts 141 of the projector control relay 126 (Fig. 18) are closed, due to the absence of an audio control signal, the projector (Fig. 17) will continue to operate, changing slides regularly in the minimum change cycle until the synchro slide is transported to the projection aperture, at which time the insulation on the surface of the synchro slide prevents completion of a circuit between contacts 77 and ground, and thus opens the Thyratron plate circuit 125 and releases relay 126. After this, when relay 153 (Fig. 20) opens its contacts as described above, this relay cannot regain control of the projector operation as contacts 142 of relay 126 now remain open. In this condition, the thermal element of relay 151 heats up and within 120 seconds opens its contacts, thus removing power from all of the circuits with the exception of the heater element for relay 151. If desired, an alarm bell or other appropriate signal may be connected with this circuit to notify an attendant at a remote location that a failure has occurred.

Fig. 21 and Fig. 22 of the drawings illustrate in detail the location of the synchro contacts 77—77 mounted on but insulated from the face plate 62 of the projector housing 10. In Fig. 21, which is drawn to full scale, the pair of contacts 77—77 are illustrated mounted above and slightly to either side of the projection aperture 33. As illustrated by Fig. 22, on an enlarged scale, the contacts 77—77 are insulated from the metallic face plate 62 by an insulating mounting strip 78, which may be of a Bakelite or other suitable insulating material.

Contacts 77—77 pass through holes 9—9 in the face plate 62 and protrude forwardly of the projection aperture 33 to form with the dimple protrusion 41, below the aperture 33, three supporting points against which successive slides are held in projection position by the magnetic attraction of magnet 55 (Fig. 22). By means of this three-point suspension, between contacts 77—77 and protrusion 41, each projected slide is registered in exactly the same plane to assure uniformly sharp focus of the successively projected images. Also, as described hereinbefore in reference to Fig. 4 of the drawings, the suspension of projected slides in spaced relation from the aperture plate 62 permits cooling air from the internal blower fan to pass around the slide holder registered at the projection aperture so that overheating and consequent buckling of the slide transparency film is prevented, thereby further assuring continued sharp focus of all projected images.

Electrical connection is made to the contact members 77—77 by a conductor 8 (Fig. 22) within the projector, which connects with external plug connector 29 on the projector housing 10. Contact members 77—77 are preferably connected in parallel with each other to assure a more positive electrical contact with the rear surface of a metallic slide holder registered at the projection aperture as represented by slide holder 63 in Fig. 22. When magnetic slide holder 63 is engaged by magnet 55 at the projection aperture, an electrical circuit is completed from contacts 77—77 through the metallic slide holder 63 to the protruding dimple 41 on the aperture face plate 62 which is grounded to the frame of the projector housing 10. This circuit, as illustrated by the schematic diagram of Fig. 17 and Fig. 18, is connected in series with the plate circuit of thyratron 125, between ground and the low potential side of the plate power supply transformer 127, whereby the presence of a conductive slide holder at the projection aperture enables the electronic relay circuit of Fig. 18 to respond to signals from the sound reproducer circuit so as to effect automatic slide changes. As described hereinbefore, the transfer of an insulated synchro slide holder to the projection aperture assures automatic synchronization between recorded sound and projected slides.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A picture slide optical projector comprising in combination a housing having a compartment for containing a plurality of individual slide holders, a substantially vertical plane projection aperture in said housing, adjustable means for tilting said housing to move said aperture from said vertical plane, means for mounting a light source to illuminate said aperture, means on said housing for mounting a projection lens in substantial alignment with the axis of said aperture, magnetic means for transporting a slide holder from one end of said compartment to said projection aperture, further magnetic means for retaining said transported slide holder in the focal plane of said aperture, means for releasing a slide holder from the focal plane of said aperture, and means for returning a released slide holder to the opposite end of said compartment.

2. A picture slide optical projector comprising in combination a housing having a compartment for containing a plurality of individual slide holders, a substantially vertical plane projection aperture in said housing, adjustable means for tilting said housing to move said aperture from said vertical plane, means for mounting a light source to illuminate said aperture, means on said housing for mounting a projection lens in substantial alignment with the axis of said aperture, magnetic means for transporting a slide holder from one end of said compartment to said projection aperture, further magnetic means for retaining said transported slide holder in the focal plane of said aperture, means operable in timed relation with said magnetic transporting means for releasing a slide holder from the focal plane of said aperture prior to the transfer of a succeeding slide holder by said transport means into engagement with said projection aperture, and means for returning said released slide holder to the opposite end of said compartment.

3. A slide projector according to claim 2 characterized in that the means for returning a released slide holder include gravity control means.

4. A slide projector according to claim 2 characterized by motor means for cyclically operating said transport and release means.

5. A slide projector according to claim 4 including means for interrupting the slide transfer cycle at a predetermined position of said transfer means.

6. A slide projector according to claim 4 including sound controlled means for interrupting the slide transfer cycle at a predetermined position of said transfer means.

7. A still picture slide projector comprising in combination a housing having an inclined compartment for containing a plurality of individual slide holders, cam operated means for selecting a slide holder from the bottom end of said inclined compartment, a projection aperture in said housing above said compartment, reciprocably movable slide transfer means on said housing, means for reciprocating said transfer means from a position in proximity to the lower end of said inclined compartment to a position adjacent said projection aperture, first magnetic means on said transfer means for engaging said selected slide holder and for transporting said holder from the lower end of said inclined compartment to said projection aperture, a second magnetic means in said housing adjacent said aperture for disengaging said transported slide holder from said magnetic transfer means and for engaging said slide holder in the focal plane of said projection aperture, means operable to interrupt the engagement of said second magnetic means with said transferred slide holder to release said slide holder from the focal plane of said aperture, and means for returning said released slide holder to the upper end of said inclined compartment.

8. In a picture slide projector, the combination comprising an inclined slide containing compartment, continuously recycling slide transfer means including a radially extending transfer arm rotatable about a horizontal axis through the projector, means for reciprocably rotating said arm about said axis, magnetic means on the radially extending portion of said arm in a position to engage a slide holder at the lower end of said inclined slide containing compartment, a cam on said axis rotatable in synchronism with the reciprocation of said arm, and means coacting with said cam to select a single slide holder from the lower end of said inclined compartment simultaneously with the rotation of said transfer arm into proximity with the lower end of said compartment, whereby the magnetic means on the radially extending portion of said arm engages said selected slide to remove said engaged slide from said housing as said transfer arm reverses its direction of rotation.

9. In a continuous recycling sequential slide projector, the combination comprising a projection aperture, a magazine compartment for containing a stack of magnetic slide holders, magnetic slide transfer means reciprocably movable between said aperture and one end of said magazine, said transfer means adapted to engage a slide holder from said magazine when said means is moved to one position, magnetic means on said transfer means for transporting an engaged slide holder from said magazine to said projection aperture when said transfer means is moved to another position, means at said aperture for disengaging said transported slide holder from said transfer means, further means for retaining said disengaged slide holder in projection position at said aperture while said transfer means moves between said aperture and said magazine, means for releasing a slide holder from said aperture, means for transporting a released slide holder from said aperture to the opposite end of said magazine, means for progressively advancing slide holders in said magazine from one end thereof to the other end thereof and means for imparting reciprocating motion to said transfer means.

10. In an optical image slide projector, a projection aperture, magnetic means for transporting a selected slide into proximity with said aperture, vertical and horizontal slide positioning means adjacent said aperture for locating said transported slide in the optical axis of said aperture, three point positioning means adjacent said aperture for locating said transported slide in the focal plane of said optical projector, and further magnetic means for engaging said transported slide with said slide positioning means.

References Cited in the file of this patent

UNITED STATES PATENTS

| 553,369 | Thompson | Jan. 21, 1896 |
| 850,027 | Lynch | Apr. 9, 1907 |
| 1,203,744 | Johnson | Nov. 7, 1916 |
| 1,428,347 | Van Altena | Sept. 5, 1922 |
| 1,522,284 | Chamberlain | Jan. 6, 1925 |
| 1,543,240 | Teeter | June 23, 1925 |
| 1,590,704 | Semelroth | June 29, 1926 |
| 1,611,843 | Van Altena | Dec. 21, 1926 |
| 1,847,139 | Seaholm et al. | Mar. 1, 1932 |
| 1,909,765 | Jenkins et al. | May 16, 1933 |
| 1,932,143 | Piercy | Oct. 24, 1933 |
| 1,966,531 | Tint | July 17, 1934 |
| 1,987,544 | Wood et al. | Jan. 8, 1935 |
| 1,989,360 | Hitchins et al. | Jan. 29, 1935 |
| 2,116,314 | Jenkins et al. | May 3, 1938 |
| 2,227,986 | Tucker | Jan. 7, 1941 |
| 2,363,388 | Boughton | Nov. 21, 1944 |
| 2,391,879 | Chambers | Jan. 1, 1946 |
| 2,606,476 | Waller et al. | Aug. 12, 1952 |
| 2,618,197 | Boushey | Nov. 18, 1952 |
| 2,653,512 | Brock | Sept. 29, 1953 |
| 2,705,439 | Waller | Apr. 5, 1955 |

FOREIGN PATENTS

| 855,049 | Germany | Nov. 10, 1952 |